US008423984B2

(12) United States Patent
Iwasaki

(10) Patent No.: US 8,423,984 B2
(45) Date of Patent: Apr. 16, 2013

(54) SYSTEM AND METHOD GENERATING OBJECT CODE

(75) Inventor: Mitsuru Iwasaki, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 485 days.

(21) Appl. No.: 12/825,874

(22) Filed: Jun. 29, 2010

(65) Prior Publication Data

US 2011/0029954 A1 Feb. 3, 2011

(30) Foreign Application Priority Data

Jul. 28, 2009 (JP) ................................. 2009-175662

(51) Int. Cl.
*G06F 9/44* (2006.01)
*G06F 9/45* (2006.01)

(52) U.S. Cl.
USPC ............................ 717/153; 717/106; 717/140

(58) Field of Classification Search ........................ None
See application file for complete search history.

(56) References Cited

U.S. PATENT DOCUMENTS

| | | | | |
|---|---|---|---|---|
| 5,845,127 A * | 12/1998 | Isozaki | .......................... | 717/159 |
| 6,678,886 B2 * | 1/2004 | Kumon | .......................... | 717/151 |
| 7,275,236 B1 * | 9/2007 | Kabe | .............. | 717/106 |
| 7,278,137 B1 * | 10/2007 | Fuhler et al. | .................. | 717/153 |
| 7,320,121 B2 * | 1/2008 | Krueger | .......................... | 717/106 |
| 7,325,230 B2 * | 1/2008 | Uchida | ......................... | 717/153 |
| 7,331,037 B2 * | 2/2008 | Dickey et al. | ................. | 717/106 |
| 7,721,274 B1 * | 5/2010 | Panchenko et al. | ............ | 717/153 |
| 2003/0074656 A1 * | 4/2003 | Irino | .............................. | 717/140 |
| 2004/0025148 A1 * | 2/2004 | Krueger | ......................... | 717/140 |
| 2004/0225921 A1 * | 11/2004 | Joshi | .................................. | 714/38 |
| 2005/0097530 A1 * | 5/2005 | Asao et al. | ..................... | 717/140 |
| 2006/0095897 A1 * | 5/2006 | Kawai et al. | ................... | 717/140 |
| 2006/0259900 A1 * | 11/2006 | Vernon | ......................... | 717/140 |

FOREIGN PATENT DOCUMENTS

| | | |
|---|---|---|
| JP | 2006-277127 A | 10/2006 |
| JP | 2007-164242 A | 6/2007 |

OTHER PUBLICATIONS

Bill Chou; Techniques for Generating Production Code Constructs from Modeling Design Patterns; Oct. 8, 2009; [online]; retrieved on Dec. 12, 2012; pp. 1-4; Retrieved from the Internet: <URL: http://www.mathworks.com/tagteam/59103_91767V00%20_C_contructs.pdf>.*

(Continued)

*Primary Examiner* — Thuy Dao
*Assistant Examiner* — Hanh T Bui
(74) *Attorney, Agent, or Firm* — Sughrue Mion, PLLC

(57) ABSTRACT

An object code generating system includes: a storage unit configured to store a first source file; and an object code generating section. The object code generating section is configured to read the first source file, generate function data indicating an arrangement address and size of each of the functions in the first source file, generate an execution format file for the first source file; and read a second source file obtained by modifying at least one of the functions as a specific function in the first source file, and the function data from the storage unit, generate a dummy function corresponding to the modified specific function when the modified specific function is discovered in the second source file, arrange the dummy function at an arrangement address different from the arrangement addresses of the functions, and arrange a branch command to the dummy function at the different arrangement address.

12 Claims, 25 Drawing Sheets

OTHER PUBLICATIONS

David B. Skillicorn and Wentong Cai; Equational Code Generation: Implementing Categorical Data Types for Data Parallelism; 1994; [online]; retrieved on Dec. 12, 2012; pp. 1-5; Retrieved from the Internet: <URL: http://ieeexplore.ieee.org/stamp/stamp.jsp?tp=&arnumber=369311>.*

Muhammad Imran Anwar et al.; A software define approach for common baseband processing; Aug. 29, 2006; [online]; retrieved on Dec. 12, 2012; pp. 1-18; Retrieved from the Internet: <URL: http://ac.els-cdn.com/S1383762108000283/1-s2.0-S1383762108000283-main.pdf?>.*

* cited by examiner

Fig. 4

FUNCTION DATA

| FUNCTION NAME | ARRANGEMENT ADDRESS | MAXIMUM SIZE (CONTAIN SIZE OF FREE AREA TO NEXT FUNCTION ON UPPER ADDRESS SIDE) | DUMMY FUNCTION FLAG |
|---|---|---|---|
| Func-A | 0x1000 | 0x500 | D_Func-A |
| Func-B | 0x1500 | 0x100 | 0 |
| ⋮ | ⋮ | ⋮ | ⋮ |
| D_Func-A | 0x80000 | 0x080 | 0 |

Fig. 5

DEBUG DATA

| LINE | ADDRESS | COMMAND CLASSIFICATION FLAG (BRANCH COMMAND TO DUMMY FUNCTION ?) | IN-DUMMY-FUNCTION FLAG | SYMBOL INDEX |
|---|---|---|---|---|
| 0 | 5 | 0 | 0 | 0 |
| Line1' | 0x01000 | BRANCH | Func-A | 11 |
| Line1 | 0x80000 | NORMAL | D_Func-A | 14 |
| Line2 | 0x80200 | NORMAL | D_Func-A | 14 |
| Line3 | 0x80400 | NORMAL | D_Func-A | 14 |
| Line4 | 0x80600 | NORMAL | D_Func-A | 14 |

Fig. 6

SYMBOL DATA

| SYMBOL INDEX | SYMBOL NAME (CONTAIN FILE NAME) | SYMBOL VALUE | SYMBOL INDEX OF DEFINITION FUNCTION | INDEX IN SYMBOL DATA OF FUNCTION TO WHICH DUMMY FUNCTION BELONGS | INDEX IN SYMBOL DATA OF GENERATED DUMMY FUNCTION | POINTER TO DEBUG DATA |
|---|---|---|---|---|---|---|
| ... | ... | ... | ... | ... | ... | |
| 10 | C1.c | 0 | 0 | 0 | 0 | |
| 11 | Func-A | 0x01000 | 10 | 0 | 14 | |
| 12 | Func-B | 0x01500 | 10 | 0 | 0 | |
| 13 | ... | ... | ... | ... | ... | |
| 14 | D-Func-A | 0x80000 | 10 | 11 | 0 | |
| ... | ... | ... | ... | ... | ... | |
| N | | | | | | |

Fig. 7A

FUNCTION DATA

| FUNCTION NAME | ARRANGEMENT ADDRESS | MAXIMUM SIZE (CONTAIN SIZE OF FREE AREA TO NEXT FUNCTION ON UPPER ADDRESS SIDE) | DUMMY FUNCTION FLAG |
|---|---|---|---|
| Func-A | 0x1000 | 0x500 | 0 |
| Func-B | 0x1500 | 0x100 | 0 |
| ... | ... | ... | ... |
| ... | ... | ... | ... |

Fig. 7B

SYMBOL DATA

| SYMBOL INDEX | SYMBOL NAME (CONTAIN FILE NAME) | SYMBOL VALUE | SYMBOL INDEX OF DEFINITION FUNCTION | INDEX IN SYMBOL DATA OF FUNCTION TO WHICH DUMMY FUNCTION BELONGS | INDEX IN SYMBOL DATA OF GENERATED DUMMY FUNCTION | POINTER TO DEBUG DATA |
|---|---|---|---|---|---|---|
| ... | ... | ... | ... | ... | ... | |
| 10 | C1.c | 0 | 0 | 0 | 0 | |
| 11 | Func-A | 0x01000 | 10 | 0 | 0 | |
| 12 | Func-B | 0x01500 | 10 | 0 | 0 | |
| 13 | ... | ... | ... | ... | ... | |
| 14 | ... | ... | ... | ... | ... | |
| ... | ... | ... | ... | ... | ... | |
| N | ... | ... | ... | ... | ... | |

Fig. 7C

DEBUG DATA

| LINE | ADDRESS | COMMAND CLASSIFICATION FLAG (BRANCH COMMAND TO DUMMY FUNCTION ?) | IN-DUMMY-FUNCTION FLAG | SYMBOL INDEX |
|---|---|---|---|---|
| 0 | 1 | 0 | 0 | 0 |
| Line1 | 0x01000 | NORMAL | Func-A | 11 |

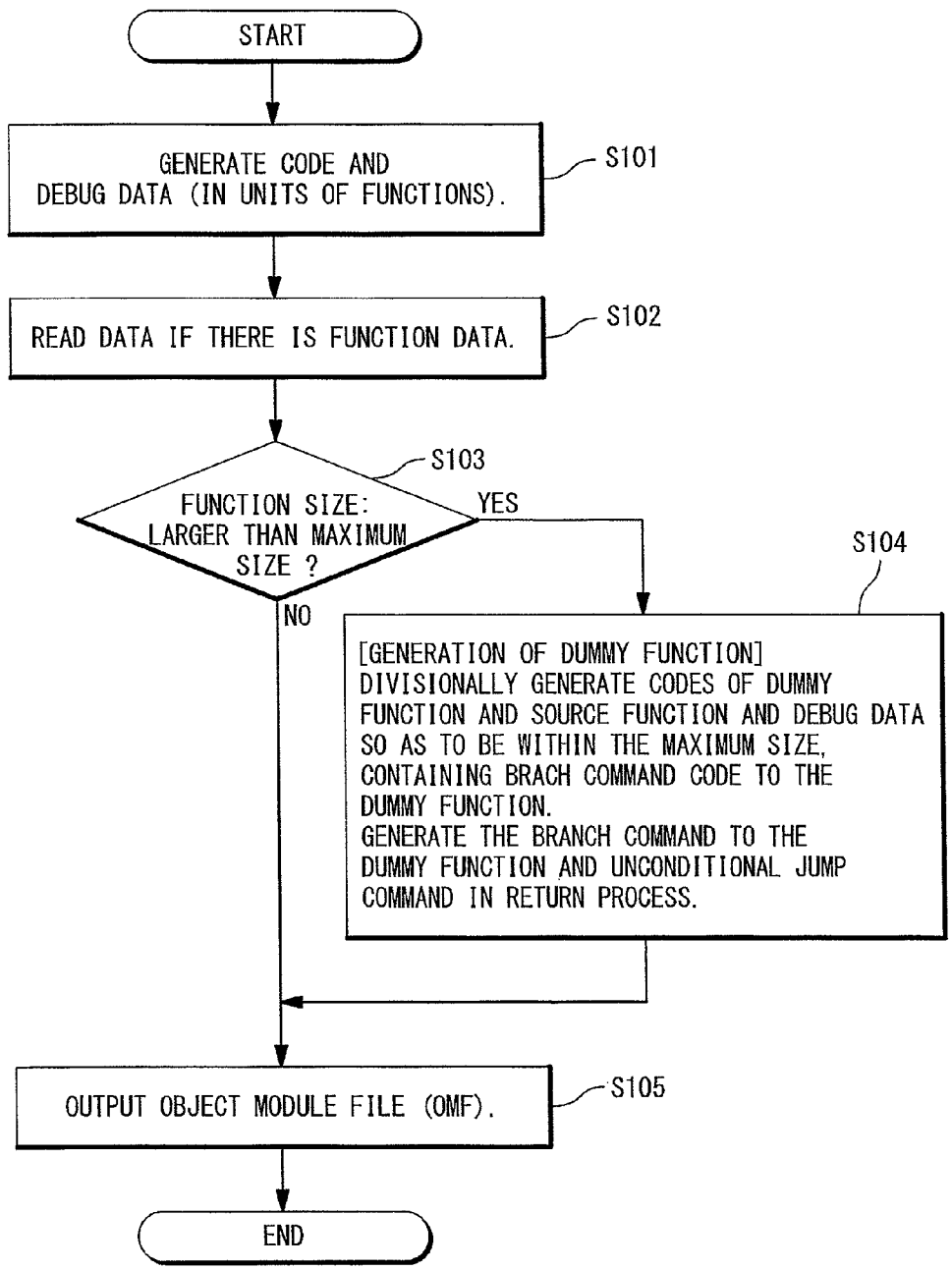

Fig. 10A

FUNCTION DATA

| FUNCTION NAME | ARRANGEMENT ADDRESS | MAXIMUM SIZE (CONTAIN SIZE OF FREE AREA TO NEXT FUNCTION ON UPPER ADDRESS SIDE) | DUMMY FUNCTION FLAG |
|---|---|---|---|
| Func-A | 0x1000 | 0x500 | D_Func-A |
| Func-B | 0x1500 | 0x100 | 0 |
| ⋮ | ⋮ | ⋮ | ⋮ |
| D_Func-A | 0x00000 | 0x080 | 0 |

Fig. 10B

SYMBOL DATA

| SYMBOL INDEX | SYMBOL NAME (CONTAIN FILE NAME) | SYMBOL VALUE | SYMBOL INDEX OF DEFINITION FUNCTION | INDEX IN SYMBOL DATA OF FUNCTION TO WHICH DUMMY FUNCTION BELONGS | INDEX IN SYMBOL DATA OF GENERATED DUMMY FUNCTION | POINTER TO DEBUG DATA |
|---|---|---|---|---|---|---|
| ... | ... | ... | ... | ... | ... | |
| 10 | C1.c | 0 | 0 | 0 | 0 | |
| 11 | Func-A | 0x01000 | 10 | 0 | 14 | |
| 12 | Func-B | 0x01500 | 10 | 0 | 0 | |
| 13 | ... | ... | ... | ... | ... | |
| 14 | D-Func-A | 0x80000 | 10 | 11 | 0 | |
| ... | ... | ... | ... | ... | ... | |
| N | ... | ... | ... | ... | ... | |

Fig. 10C

DEBUG DATA

| LINE | ADDRESS | COMMAND CLASSIFICATION FLAG (BRANCH COMMAND TO DUMMY FUNCTION ?) | IN-DUMMY-FUNCTION FLAG | SYMBOL INDEX |
|---|---|---|---|---|
| 0 | 5 | 0 | 0 | 0 |
| Line1' | 0x01000 | BRANCH | Func-A | 11 |
| Line1 | 0x00000 | NORMAL | D_Func-A | 14 |
| Line2 | 0x00200 | NORMAL | D_Func-A | 14 |
| Line3 | 0x00400 | NORMAL | D_Func-A | 14 |
| Line4 | 0x00600 | NORMAL | D_Func-A | 14 |

Fig. 12A

FUNCTION DATA

| FUNCTION NAME | ARRANGEMENT ADDRESS | MAXIMUM SIZE (CONTAIN SIZE OF FREE AREA TO NEXT FUNCTION ON UPPER ADDRESS SIDE) | DUMMY FUNCTION FLAG |
|---|---|---|---|
| Func-A | 0x1000 | 0x500 | D_Func-A |
| Func-B | 0x1500 | 0x100 | 0 |
| ⋮ | ⋮ | ⋮ | ⋮ |
| D_Func-A | 0x80000 | 0x080 | 0 |

Fig. 12B

SYMBOL DATA

| SYMBOL INDEX | SYMBOL NAME (CONTAIN FILE NAME) | SYMBOL VALUE | SYMBOL INDEX OF DEFINITION FUNCTION | INDEX IN SYMBOL DATA OF FUNCTION TO DUMMY FUNCTION BELONGS | INDEX IN SYMBOL DATA OF GENERATED DUMMY FUNCTION | POINTER TO DEBUG DATA |
|---|---|---|---|---|---|---|
| ... | ... | ... | ... | ... | ... | |
| 10 | C1.c | 0 | 0 | 0 | 0 | |
| 11 | Func-A | 0x01000 | 10 | 0 | 14 | |
| 12 | Func-B | 0x01500 | 10 | 0 | 0 | |
| 13 | ... | ... | ... | ... | ... | |
| 14 | D-Func-A | 0x80000 | 10 | 11 | 0 | |
| ... | ... | ... | ... | ... | ... | |
| N | | | | | | |

Fig. 12C

DEBUG DATA

| LINE | ADDRESS | COMMAND CLASSIFICATION FLAG (BRANCH COMMAND TO DUMMY FUNCTION ?) | IN-DUMMY-FUNCTION FLAG | SYMBOL INDEX |
|---|---|---|---|---|
| 0 | 5 | 0 | 0 | 0 |
| Line1' | 0x01000 | BRANCH | Func-A | 11 |
| Line1 | 0x80000 | NORMAL | D_Func-A | 14 |
| Line2 | 0x80200 | NORMAL | D_Func-A | 14 |
| Line3 | 0x80400 | NORMAL | D_Func-A | 14 |
| Line4 | 0x80600 | NORMAL | D_Func-A | 14 |

Fig. 16A

FUNCTION DATA

| FUNCTION NAME | ARRANGEMENT ADDRESS | MAXIMUM SIZE (CONTAIN SIZE OF FREE AREA TO NEXT FUNCTION ON UPPER ADDRESS SIDE) | DUMMY FUNCTION FLAG |
|---|---|---|---|
| Func-A | 0x1000 | 0x500 | D_Func-A |
| Func-B | 0x1500 | 0x100 | 0 |
| ⋮ | ⋮ | ⋮ | ⋮ |
| D_Func-A | 0x80000 | 0x080 | 0 |

Fig. 16B

SYMBOL DATA

| SYMBOL INDEX | SYMBOL NAME (CONTAIN FILE NAME) | SYMBOL VALUE | SYMBOL INDEX OF DEFINITION FUNCTION | INDEX IN SYMBOL DATA OF FUNCTION TO WHICH DUMMY FUNCTION BELONGS | INDEX IN SYMBOL DATA OF GENERATED DUMMY FUNCTION | POINTER TO DEBUG DATA |
|---|---|---|---|---|---|---|
| ... | ... | ... | ... | ... | ... | |
| 10 | C1.c | 0 | 0 | 0 | 0 | |
| 11 | Func-A | 0x01000 | 10 | 0 | 0 | |
| 12 | Func-B | 0x01500 | 10 | 0 | 0 | |
| 13 | ... | ... | ... | ... | ... | |
| 14 | D-Func-A | 0x80000 | 10 | 11 | 0 | |
| ... | ... | ... | ... | ... | ... | |
| N | | | | | | |

Fig. 16C

DEBUG DATA

| LINE | ADDRESS | COMMAND CLASSIFICATION FLAG (BRANCH COMMAND TO DUMMY FUNCTION ?) | IN-DUMMY-FUNCTION FLAG | SYMBOL INDEX |
|---|---|---|---|---|
| 0 | 5 | 0 | 0 | 0 |
| Line1' | 0x01000 | BRANCH | Func-A | 11 |
| Line1 | 0x80000 | NORMAL | D_Func-A | 14 |
| Line2 | 0x80200 | NORMAL | D_Func-A | 14 |
| Line3 | 0x80400 | NORMAL | D_Func-A | 14 |
| Line4 | 0x80600 | NORMAL | D_Func-A | 14 |

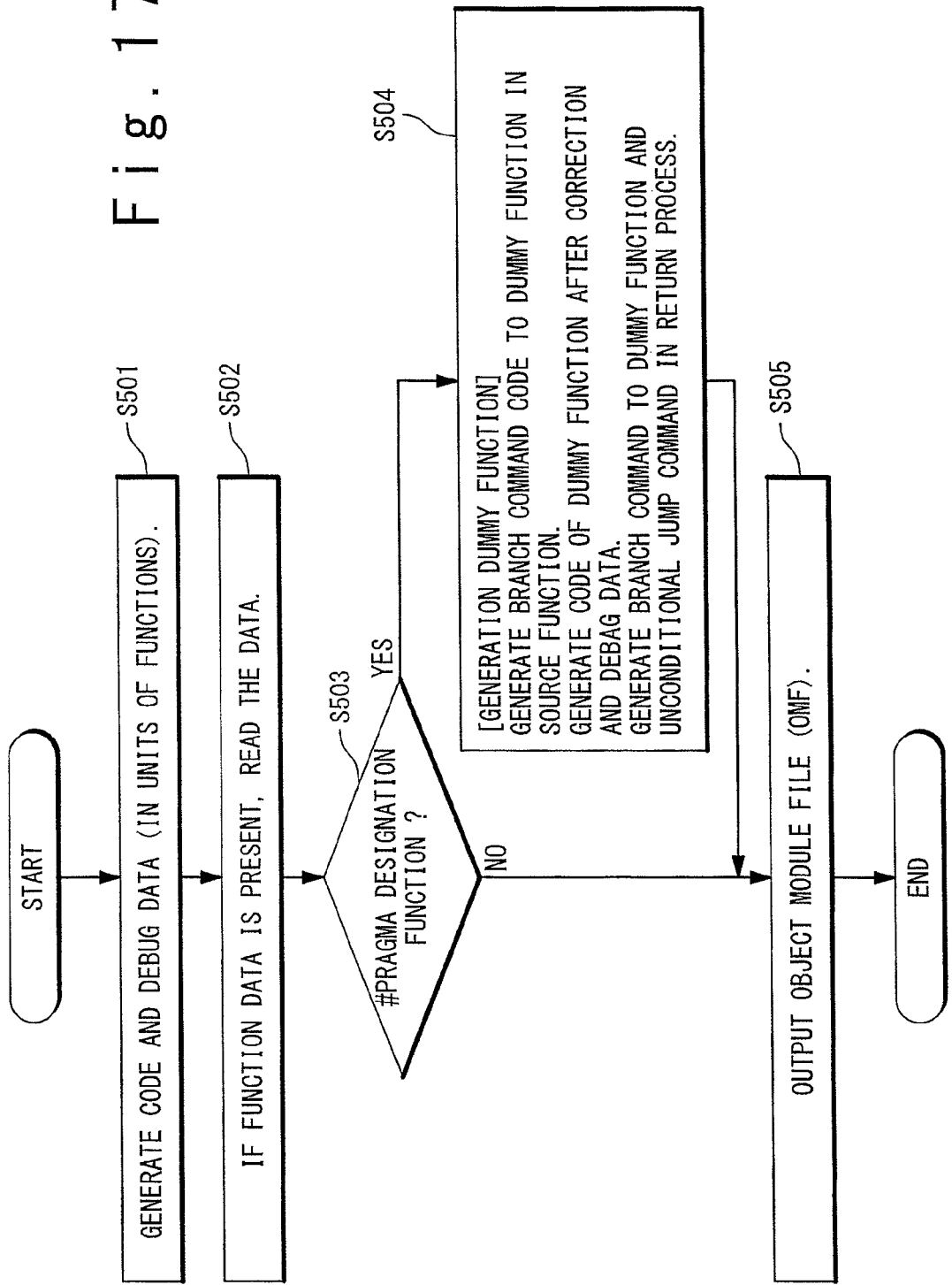

SYSTEM AND METHOD GENERATING OBJECT CODE

INCORPORATION BY REFERENCE

This patent application claims a priority on convention based on Japanese Patent Application No. 2009-175662 filed on Jul. 28, 2009. The disclosure thereof is incorporated herein by reference.

TECHNICAL FIELD

The present invention relates to an object code generating system, and more particularly relates to an object code generating system of a C compiler for an embedded micro-computer.

BACKGROUND ART

FIG. 1 shows a block diagram of a system for typical software development. In an object code generating method by a C compiler, as a modification portion of a source program (source code) becomes closer to the head of an address, a difference on the object code becomes greater, when the source program is modified. When the difference on the object code before and after the modification of the source program is great, the size of the code to be rewritten in a flash memory built in an embedded micro-computer is also large. For this reason, the efficiency of the object code generating method by the C compiler is desired to be made higher to minimize the difference.

For the object code generating method by the C compiler for the embedded micro-computer, a system for efficiently locating the object code is described in Patent Literature 1. FIG. 1 of the Patent Literature 1 shows a configuration diagram of a system which minimizes the number of rewrite blocks of the flash memory built in the embedded micro-computer, by minimizing the difference between the object codes generated before and after the modification of the source program, in a conventional software development.

The operation to generation of object code in the conventional technique will be described below in the following (1) to (6).
(1) Programs before and after a modification of a source program file are referred to as an old source program file and a new source program file, respectively, and both the files are compiled by using the C compiler.
(2) A block data file of a flash memory that is different for each device is prepared before compiling and is read.
(3) The C compiler refers to a difference in code size between the new and old source program files and a block configuration of the flash memory and generates the object code.
(4) When the code size of the object code increases in the new source program file, the C compiler replaces a portion modified in the new source program file with a branch command and generates the object code, and generate the object code in an added source program portion for a block in which the object code is arranged before the modification.
(5) When a object code portion for the branch command is arranged over two blocks, a command arranged in a address ascending direction from an original location at which the branch command is arranged is moved to a new location corresponding to a block in which the object code has not been arranged before the modification, and the branch command is arranged at the original location.
(6) When the new source program file is described to decrease the number of codes of the object code, the C compiler adds dummy commands for the number of codes of a removed source program file portion, to the removed source program file portion and then generates the object code.

When program development for the embedded system is assumed, an execution speed, an execution timing and the behavior on the execution of the modified program vary if the location in a memory is changed. Accordingly, a program portion in which any modification is not performed is required to be arranged in the same location as the location in a case of no modification, even after the modification. Also, in the case of the program which is arranged in the same location to which any modification is not performed, a test can be efficiently performed.

However, in the conventional technique, as a method of shifting the object code of a modified portion to a free region without changing the addresses of the non-modified potion of the object code, a jump command is generated as necessary while the object codes are compared, when the compiler complies the source program files before and after the modification. In this method, attention is paid to only the object size. Thus, a predetermined block data of a flash memory is separately required.

Also, as the related art, a method of comparing programs that allows a program modification data to be obtained as a logical data block for a design is described in Patent Literature 2. In this related art, defines items to be compared for each hierarchy structure of module, file, function and source code, as the logical structures on the design, in the program targeted for the comparison, and carries out the comparison. Also, the comparison result is once recorded as a program modification data in a modification content holding section. Also, from the program modification data of the modification content holding section, a modification data output data having a hierarchy structure is prepared and displayed.

CITATION LIST

[Patent Document 1]: JP 2007-164242A
[Patent Document 2]: JP 2006-277127A

SUMMARY OF THE INVENTION

Japanese Patent Publication (JP 2007-164242A) (Patent Literature 1) describes the technique for rewriting the object code, for the flash memory. Specifically, when the modification in a source program file causes the number of codes of the object code to be increased, a portion added in the object code after the modification is arranged in a non-used region of the flash memory as a subroutine.

However, in the above technique, the subroutine is produced in units of blocks. Thus, when the code size of one function is large and is located over a plurality of blocks, many subroutines and branch commands would be generated, depending on the modification content in the source program. In such a case, the efficiency will be degraded.

For example, when one function is located over four blocks and the number of codes is modified to be increased in portions corresponding to the three blocks, the subroutines and branch commands for the three blocks are consequently generated.

In an aspect of the present invention, an object code generating system includes: a storage unit configured to store a first source file; and an object code generating section. The object code generating section is configured to read the first source file from the storage unit, generate function data to store in the storage unit, the function data indicating an arrangement address and size of each of functions in the first source file, generate an execution format file for the first source file to store in the storage unit; and read a second source file obtained by modifying at least one of the functions as a specific function in the first source file, and the function data from the storage unit, generate a dummy function corresponding to the modified specific function when the modified specific function having a size larger than a maximum size of the sizes of the functions in the function data is discovered in the second source file, arrange the dummy function at an arrangement address different from the arrangement addresses of the functions, and arrange a branch command to the dummy function at the different arrangement address.

In another aspect of the present invention, an object code generating method executed by a computer, is achieved by reading a first source file from a storage unit; by generating function data to store in the storage unit, wherein the function data indicates an arrangement address and size of each of functions in the first source file; by generating an execution format file for the first source file to store in the storage unit; by reading a second source file obtained by modifying at least one of the functions as a specific function in the first source file, and the function data from the storage unit; by generating a dummy function corresponding to the modified specific function when the modified specific function having a size larger than a maximum size of the sizes of the functions in the function data is discovered in the second source file; by arranging the dummy function at an arrangement address different from the arrangement addresses of the functions; and by arranging a branch command to the dummy function at the different arrangement address.

In still another aspect of the present invention, a computer-readable recording medium in which a computer-executable program code is stored to attain an object code generating method which is achieved by reading a first source file from a storage unit; by generating function data to store in the storage unit, wherein the function data indicates an arrangement address and size of each of functions in the first source file; by generating an execution format file for the first source file to store in the storage unit; by reading a second source file obtained by modifying at least one of the functions as a specific function in the first source file, and the function data from the storage unit; by generating a dummy function corresponding to the modified specific function when the modified specific function having a size larger than a maximum size of the sizes of the functions in the function data is discovered in the second source file; by arranging the dummy function at an arrangement address different from the arrangement addresses of the functions; and by arranging a branch command to the dummy function at the different arrangement address.

The code size of a function before a modification and the code size of the function after the modification are compared. When the code size of the function after the modification is larger, a dummy function is generated only for the function after the modification, and the arrangement addresses of other non-modified functions are not modified. Thus, the number of branch commands can be suppressed to be minimum.

BRIEF DESCRIPTION OF THE DRAWINGS

The above and other objects, advantages and features of the present invention will be more apparent from the following description of certain embodiments taken in conjunction with the accompanying drawings, in which:

FIG. 4 is a diagram showing an example of function data in the present invention;

FIG. 5 is a diagram showing an example of a debug data in the present invention;

FIG. 6 is a diagram showing an example of a symbol data in the present invention;

FIG. 7A is a diagram showing an example of a function data before a modification in the present invention;

FIG. 7B is a diagram showing an example of a debug data before the modification in the present invention;

FIG. 7C is a diagram showing an example of a symbol data before the modification in the present invention;

FIG. 9 is a flowchart in a compiling operation in the present invention;

FIG. 10A is a diagram showing an example of the function data after compiling of a modification function in the present invention;

FIG. 10B is a diagram showing an example of the debug data after compiling of a modification function in the present invention;

FIG. 10C is a diagram showing an example of the symbol data after compiling of a modification function in the present invention;

FIG. 12A is a diagram showing an example of the function data after linkage of the modification function in the present invention;

FIG. 12B is a diagram showing an example of the debug data after linkage of the modification function in the present invention;

FIG. 12C is a diagram showing an example of the symbol data after linkage of the modification function in the present invention;

FIG. 16A is a diagram showing an example of the function data after linkage of the modification function in the second embodiment of the present invention;

FIG. 16B is a diagram showing an example of the debug data after linkage of the modification function in the second embodiment of the present invention;

FIG. 16C is a diagram showing an example of the symbol data after linkage of the modification function in the second embodiment of the present invention; and FIG. 17 is a flowchart in the compiling operation by the object code generating system according to a third embodiment of the present invention.

DESCRIPTION OF EMBODIMENTS

Hereinafter, an object code generating system according to of the present invention will be described in detail with reference to the attached drawings. The object code generating system is realized by a computer executing a source code generation program which is loaded from a recording medium (not shown) and stored in the computer.

First Embodiment

Figure 1:
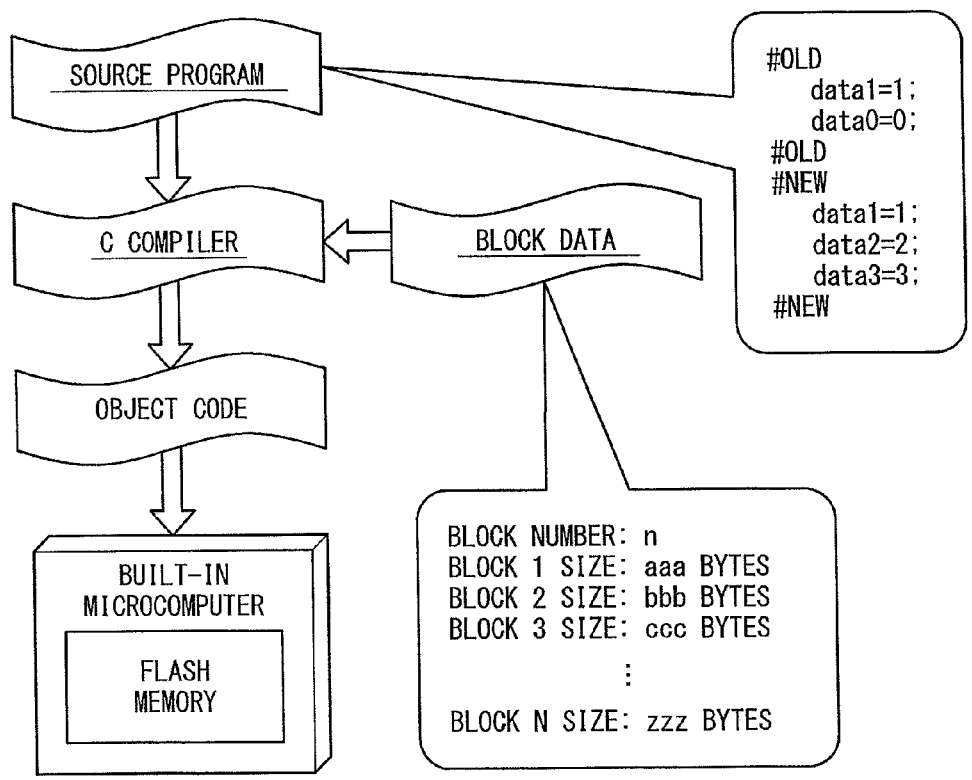
FIG. 1 is a system block diagram in a conventional software development.
Figure 2:
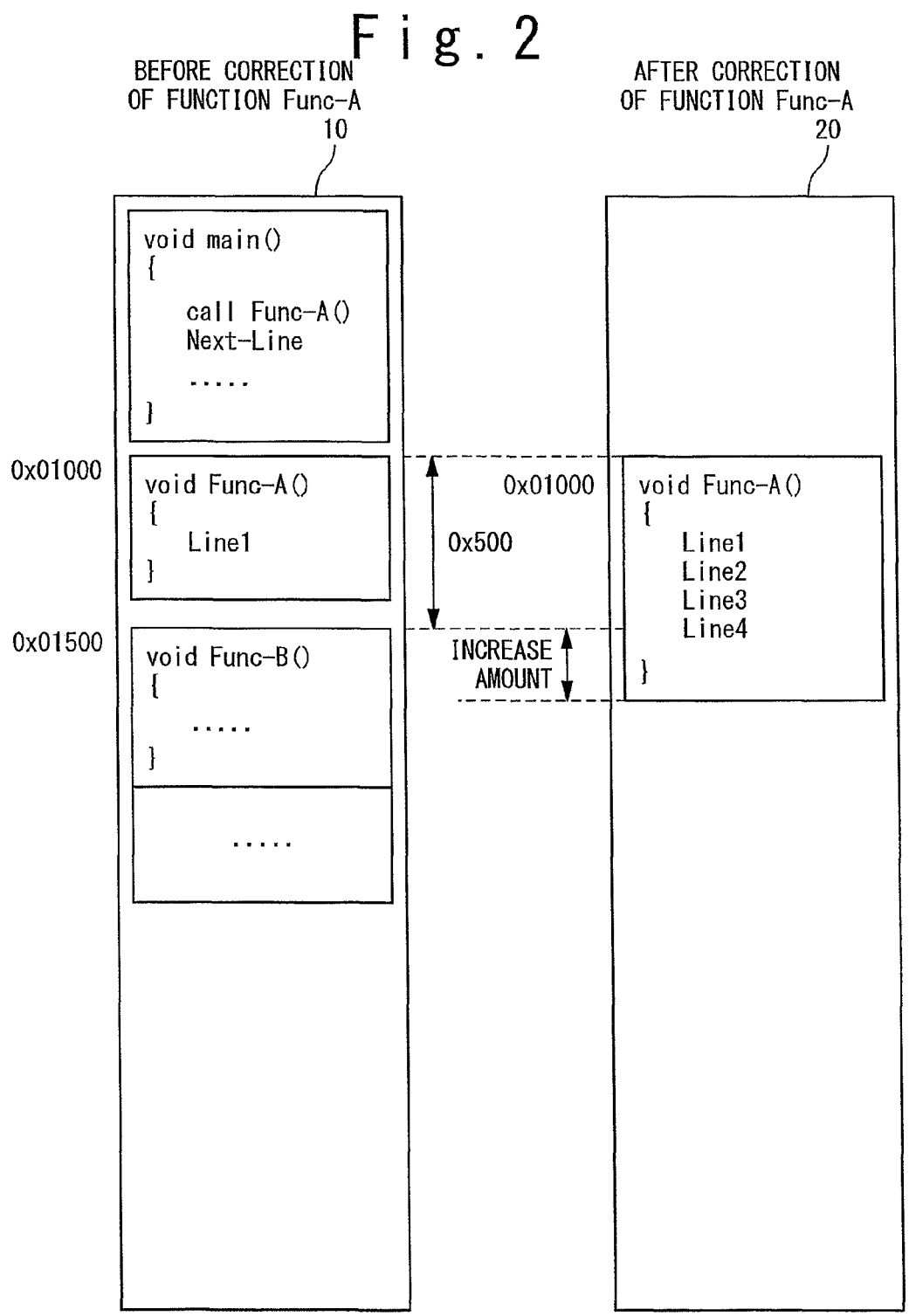
FIG. 2 is a diagram showing examples before and after a modification of a source program in the present invention.

Now, the object code generating system according to a first embodiment of the present invention will be described. FIG. 2 is a sample source file showing an example in which a code size after a modification of a function increases.

An old C source file (a source file described in the C language) 10 before a modification in FIG. 2 includes a main function, a Func-A function and a Func-B function. Here, the Func-A function before the modification is arranged at the address of 0x01000, and the Func-B function before the modification is arranged at the address of 0x1500.

A new C source file 20 after the modification in FIG. 2 is a source file focused to the Func-A function after the modification and indicates that an address space for the Func-A function after the modification increases as compared with that before the modification.

(System Configuration)

Figure 3:
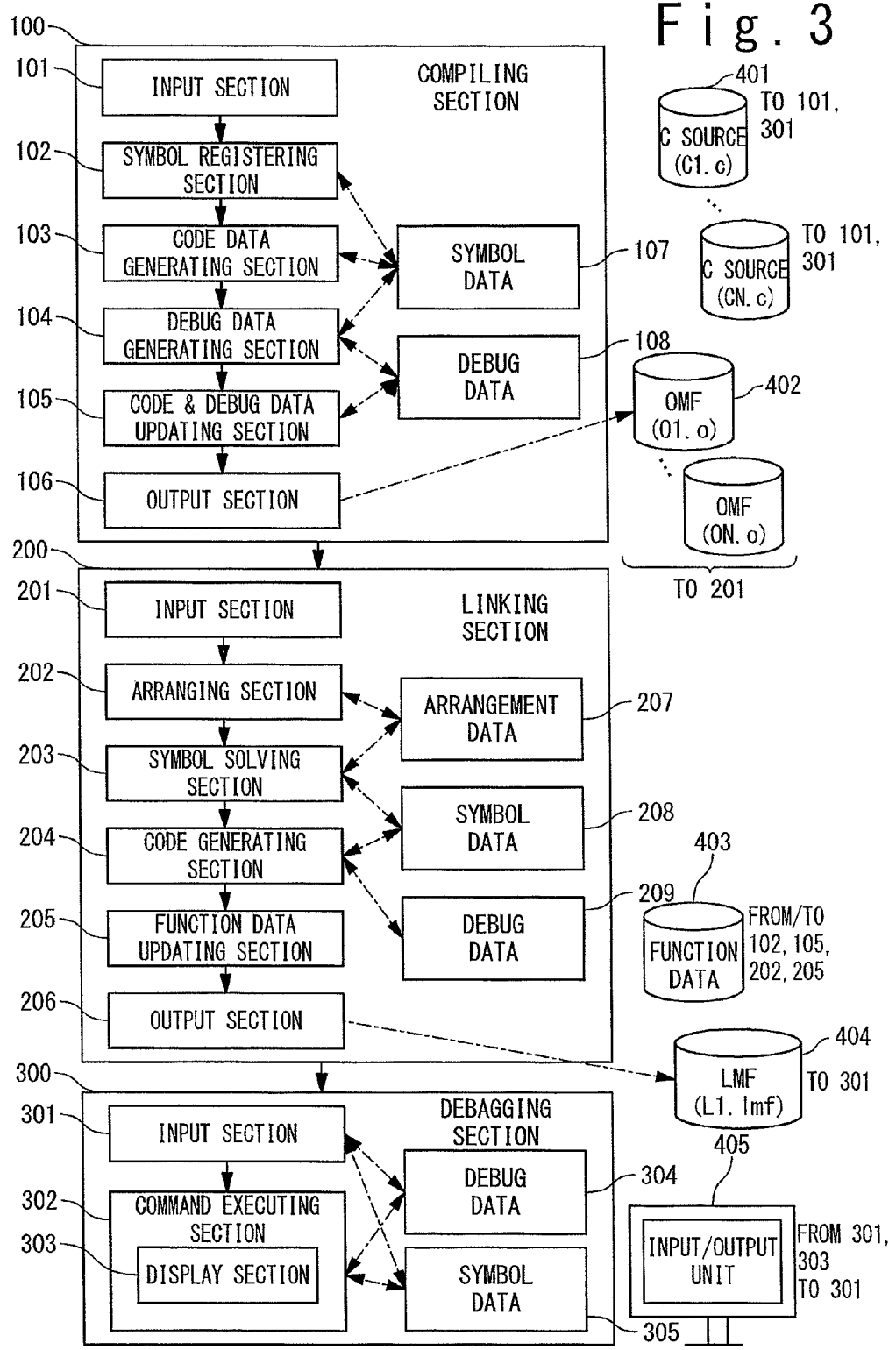
FIG. 3 is a diagram showing a system configuration of an object code generating system according to an embodiment of the present invention.

FIG. 3 shows a system configuration diagram of the present invention. The object code generating system of the present invention is the computer executing the source code generation program and includes a compiling section 100, a linking section 200 and a debugging section 300.

The compiling section 100 carries out a process of compiling a source file (source code) into object code that is a set of machine languages. The linking section 200 carries out a linking process, analyzes the object code to find out different object codes and libraries to be referred, and combines necessary codes and libraries to generate an execution file. The debugging section 300 carries out a debugging process to support discovery and modification of a defect portion (bug) in a file. The debugging section 300 has a "brake-point" function for braking the execution of the execution file at a specific line, as necessary, a "step execution" function for executing the file while checking for each step, and a "trace" function for checking the states of memories and registers and values of variables during the execution of the file.

As an example of the compiling section 100, a compiler is considered, as an example of the linking section 200, a linker is considered, and as an example of the debugging section 300, a debugger is considered. It should be noted that as examples of the specific hardware configurations of the compiling section 100, the linking section 200 and the debugging section 300, the computer such as PC (Personal Computer), and a server, processing apparatuses such as CPU (Central Processing Unit) and a microprocessor, and a semiconductor integrated circuit (IC) having the same functions as in the above apparatus are considered. Also, as examples of hardware units for storing data that are inputted/outputted from/to the compiling section 100, the linking section 200 and the debugging section 300, RAM (Random Access Memory), EEPROM (Electrically Erasable and Programmable Read Only Memory), and a non-volatile memory such as a flash memory are considered. However, actually, they are not limited to those examples.

The compiling section 100 includes an input section 101, a symbol registering section 102, a code data generating section 103, a debug data generating section 104, a code & debug data updating section 105 and an output section 106.

The input section 101 inputs the C source file 401 and performs a syntax analysis on the C source file 401. Here, the C source file 401 is the old C source file 10 before a modification or the new C source file 20 after the modification. The symbol registering section 102 registers symbols (debug symbols) in a symbol data 107 in accordance with the syntax analysis. The code data generating section 103 generates the object code in accordance with the C source file 401. The debug data generating section 104 generates a debug data 108 in accordance with the C source file 401. If there is a difference between the debug data 108 and a function data 403, the code & debug data updating section 105 updates the object code and the debug data 108 in accordance with the difference. The output section 106 outputs an OMF (Object Module File) 402 that is an output result of the compiler. The OMF includes the debug data 108, the symbol data 107 and the object code upon the compiling.

The linking section 200 contains an input section 201, an arranging section 202, a symbol solving section 203, a code generating section 204, a function data updating section 205 and an output section 206.

The input section 201 inputs the OMF 402 and generates an arrangement data 207, a symbol data 208 and a debug data 209 in accordance with the OMF 402. The arranging section 202 arranges functions and determines arrangement addresses. At this time, the arranging section 202 updates the arrangement data 207 in accordance with the determined arrangement addresses. The symbol solving section 203 compensates and determines symbol values of the functions in response to the determination of the arrangement addresses. At this time, the symbol solving section 203 updates the symbol data 208 in accordance with the determined symbol values. The code generating section 204 uses the determined symbol values and generates the object code of an execution type. The function data updating section 205 updates the arrangement addresses and the size data for the function data 403, when the object code in an execution format is determined. The output section 206 outputs an LMF (Load Module File) 404 that is the output result of a linker. The LMF includes the debug data 209, the symbol data 208 and the object code upon the linkage.

The debugging section 300 includes an input section 301, a command executing section 302 and a display section 303.

The input section 301 inputs the LMF 404, reads the object code and the debug data from the LMF 404 for preparation of debugging, and generates a debug data 304 and a symbol data 305. The command executing section 302 analyzes a debug command specified by a user, and sets and executes a debug command. The display section 303 displays the input/output result of the debug command on an input/output unit 405.

FIG. 4 is a diagram showing the details of the function data 403 in the present invention. The function data 403 has fields of a function name, an arrangement address, a maximum size and a dummy function flag. Those data are related to each other. The function name field holds data such as "Func-A", "Func-B", and "D_Func-A", which are names to identify the functions. The arrangement address field holds data such as the addresses of "0x01000", "0x1500", and "0x80000", which are the head addresses of regions in which the functions are arranged. The maximum size field holds data such as the sizes of "0x500", "0x100", and "0x080", which indicate the sizes of regions in which the functions are arranged. The dummy function flag field holds data such as "D_Func-A", and "0", which indicate the presence or absence of a dummy function corresponding to each of the functions. In FIG. 4, the dummy function flag field holds the function name of the dummy function if there is the dummy function corresponding to each function, and holds "0" if there is not the dummy function corresponding to the function.

FIG. 5 is a diagram showing the details of the debug data 108, 209 and 304 in the present invention. Each of the debug data 108, 209 and 304 has fields of a line, an address, a command classification flag, an in-dummy-function flag and a symbol index. Those data are related to each other. The line field holds data such as "Line1'", "Line1", "Line2", "Line3", and "Line4", which indicate the names to identify the lines in the function. The address field holds data such as the addresses of "0x01000", "0x80000", "0x80200", "0x80400", and "0x80600", which indicate the head addresses of regions in which the lines are arranged. The command classification flag field holds data such as "branched", and "normal", which indicate whether or not the line is a branch command to the dummy function. The in-dummy-function flag field holds data such as "Func-A", and "D_Func-A", which indicate the presence or absence of the dummy function to check whether or not it is the debug inside the dummy function. The symbol index field holds data such as "11", and "14", which indicate the identification numbers of the symbols.

The debug data 108, 209 and 304 in the present invention describe only the data corresponding to the function.

FIG. 6 is a diagram showing the details of the symbol data 107, 208 and 305 in the present invention. Each of the symbol data 107, 208 and 305 has fields of a symbol index, a symbol name, a symbol value, a symbol index of a definition function, an in-symbol-data index of a function to which the dummy function belongs, an in-symbol-data index of the generated dummy function, and a pointer to the debug data. Those data are correlated to each other.

The symbol index holds data such as "10" to "14", which indicate the identification number of the symbol. The symbol name field holds data such as "C1.c", "Func-A", "Func-B", and "D_Func-A", which indicate file names or function names corresponding to the symbols as identification data of the symbols. The symbol value field holds data such as the addresses of "0x01000", "0x1500", and "0x80000", which indicate the head addresses of the regions in which the symbols are arranged. The field of the symbol index of the definition function holds data such as "10", which indicates a symbol index of a file to which the function belongs in the symbol data, when the symbol indicates the function. The field of the in-symbol-data index of a function to which a dummy function belongs holds data such as "11", which indicates the symbol index of the function generating the dummy function in the symbol data, when the symbol indicates the dummy function. The field of the in-symbol-data index of the generated dummy function holds data such as "14", which indicates the symbol index of the dummy function generated by the function in the symbol data, when the symbol indicates the function and the function generates the dummy function. The field of the pointer to the debug data holds data that indicate the pointers to refer to the symbol index in the debug data corresponding to the symbol index.

(LMF Generating Process)

At first, a process to when the old C source file 10 before the modification is used to generate the LMF 404 will be described.

In the compiling section 100, the input section 101 inputs the old C source file 10, and after processes of the symbol registering section 102, the code data generating section 103 and the debug data generating section 104, the function data 403 is outputted, and then the code & debug data updating section 105 updates the function data 403, and the output section 106 outputs the OMF 402. Here, the input section 101 inputs the old C source file 10. The symbol registering section 102 generates the symbol data 107 in accordance with the old C source file 10. The code data generating section 103 generates the object code in accordance with the old C source file 10. The debug data generating section 104 generates the debug data 108 in accordance with the old C source file 10. The code & debug data updating section 105 updates the function data 403. The output section 106 outputs the OMF 402.

In the linking section 200, the input section 201 inputs the OMF 402, and after the processes of the arranging section 202, the symbol solving section 203 and the code generating section 204, the function data updating section 205 updates the function data 403, and the output section 206 outputs the LMF 404. Also, in the linking section 200, the function data updating section 205 updates the arrangement address and the maximum size to the uppermost arrangement address in units of functions. Here, the input section 201 inputs the OMF 402. The arranging section 202 determines the arrangement address in accordance with the OMF 402. The symbol solving section 203 updates the symbol value based on the OMF 402. The code generating section 204 completes the object code in accordance with the symbol value. After the processes of the arranging section 202, the symbol solving section 203 and the code generating section 204, the function data updating section 205 updates the function data 403. The output section 206 outputs the LMF 404. At this time, the function data updating section 205 updates the arrangement address and the maximum size to the uppermost arrangement address for every function.

It should be noted that in the present invention, a series of processes from a process in which the input section 101 of the compiling section 100 inputs the old C source file 10, to a process in which the output section 206 of the linking section 200 outputs the LMF 404, are referred to as a first object code generating process. Also, a combination of the compiling section 100 and the linking section 200, which perform the processes on the old C source file 10, is referred to as a first object code generating section.

FIGS. 7A to 7C show the function data, the symbol data 107 and the debug data 108 at this time (immediately after the LMF generating process).

Figure 8:
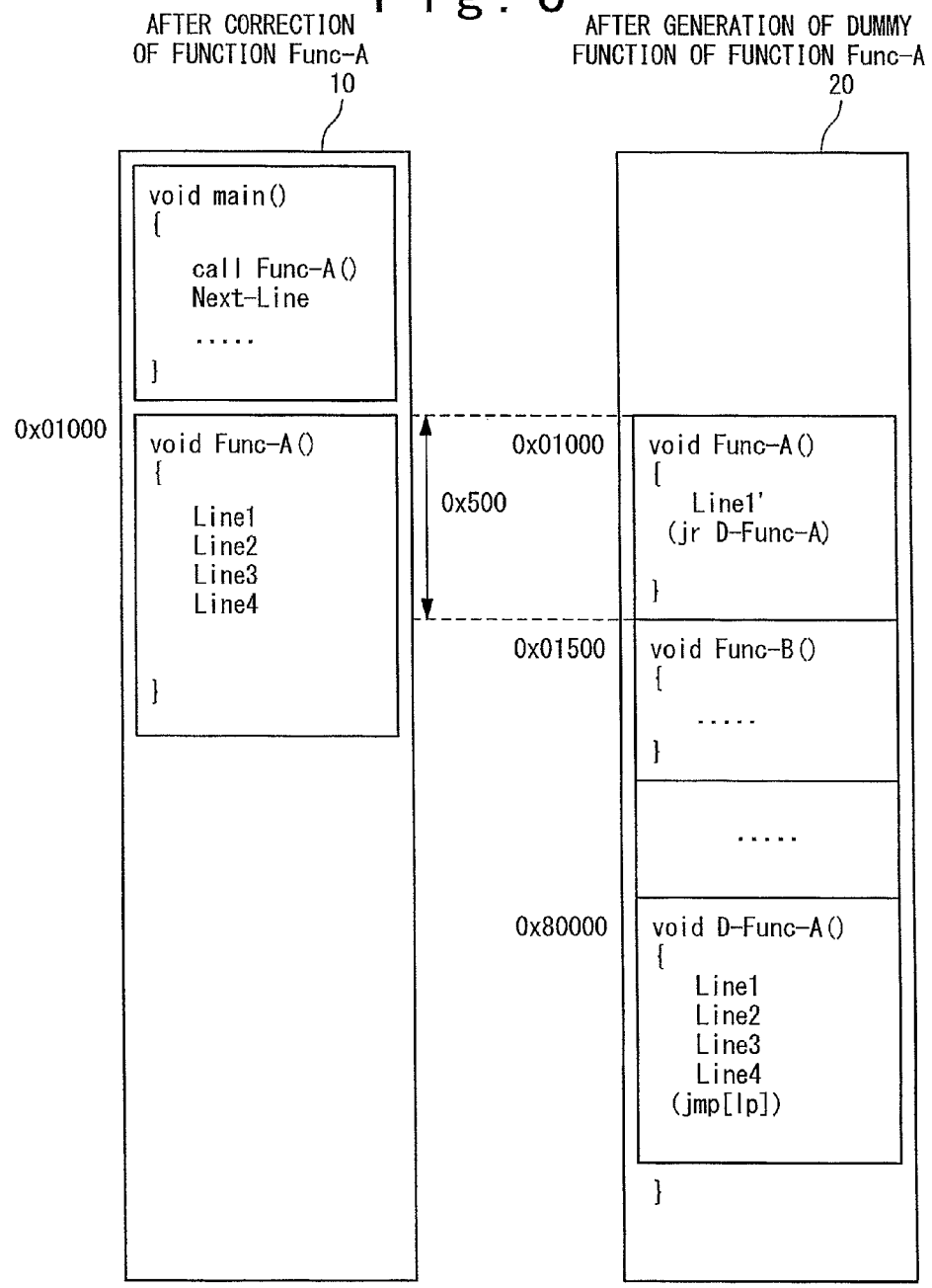
FIG. 8 is a diagram showing an example after the modification of the source program file and the generation of a dummy function in the present invention.

A case of modifying the old C source file 10 into a new C source file 20 with respect to the function of "Func-A" will be described below, as shown in FIG. 8.

(Compiling Process after Modification)

The process of the compiling section 100 will be described with reference to FIG. 9.

(1) Step S101

The compiling section 100 reads the new C source file 20 after the modification, and the processes of the symbol registering section 102, the code data generating section 103 and the debug data generating section 104 generate the object code and the debug data 108 for every function, and also generate the symbol data 107 and the debug data 108, on the course of the generation. Here, the input section 101 inputs the new C source file 20. The symbol registering section 102 generates the symbol data 107 of the function after the modification in accordance with the new C source file 20. The code data generating section 103 generates the object code of the function after the modification in accordance with the new C source file 20. The debug data generating section 104 generates the debug data 108 of the function after the modification in accordance with the new C source file 20.

(2) Step S102

The code & debug data updating section 105 reads the function data 403 generated when the old C source file 10 is compiled.

(3) Step S103

The code & debug data updating section 105 checks whether or not the object code size of the function after the modification is larger than the maximum size of the function before the modification in the function data 403. Here, the code & debug data updating section 105 compares the object code size of the function after the modification generated at the step S101 and the maximum size of the function before the modification in the function data 403. At this time, if the object code size of the function after the modification is equal to or less than the maximum size of the function before the modification in the function data 403, the code & debug data updating section 105 uses the object code of the function after the modification without any change.

(4) Step S104

If the object code size of the function after the modification is larger than the maximum size of the function before the modification in the function data 403, the code & debug data updating section 105 divides the code and the debug data 108 into an original function (the function after the modification) and a dummy function so that it falls within the maximum size, and generates the object code that falls within the maximum size. Also, the code & debug data updating section 105 generates a branch command to the dummy function and an unconditional jump command at a time of a returning process. Here, the code & debug data updating section 105 divides the original function and generates the dummy function. At this time, the code & debug data updating section 105 divides the original function to have the size at which a total size of the code size of the original function and the code size of the branch command to the dummy function falls within the maximum size of the function before the modification, and then generates the dummy function. Also, the code & debug data updating section 105 updates the debug data 108 in accordance with the generated dummy function. Hereinafter, the code of this original function and the code of the dummy function serve as object code portions of the functions after the modification, respectively. Also, the code & debug data updating section 105 uses the branch command to the dummy function and the unconditional jump command for the sake of the returning process. In the new C source file 20 in FIG. 8, "jmp(1p)" is indicated as an example of the unconditional jump command.

(5) Step S105

The code & debug data updating section 105 outputs the object code of the function after the modification to an OMF 402 for post-modification. Here, the code & debug data updating section 105 adds the object code of the function after the modification, to the OMF 402 for post-modification, for each function. The OMF 402 for post-modification is obtained by adding the branch command to the dummy function and the unconditional jump command at the time of the returning process to the OMF 402 for post-modification. The code & debug data updating section 105 determines the OMF 402 for post-modification, when the object code of the function after the modification is outputted to the OMF 402 for post-modification, for all of the functions. After that, the output section 106 outputs the OMF 402 for post-modification.

FIGS. 10A, 10B and 10C show the function data, the symbol data and the debug data at this time (immediately after the compiling process after the modification).

(Linking Process)

Figure 11:
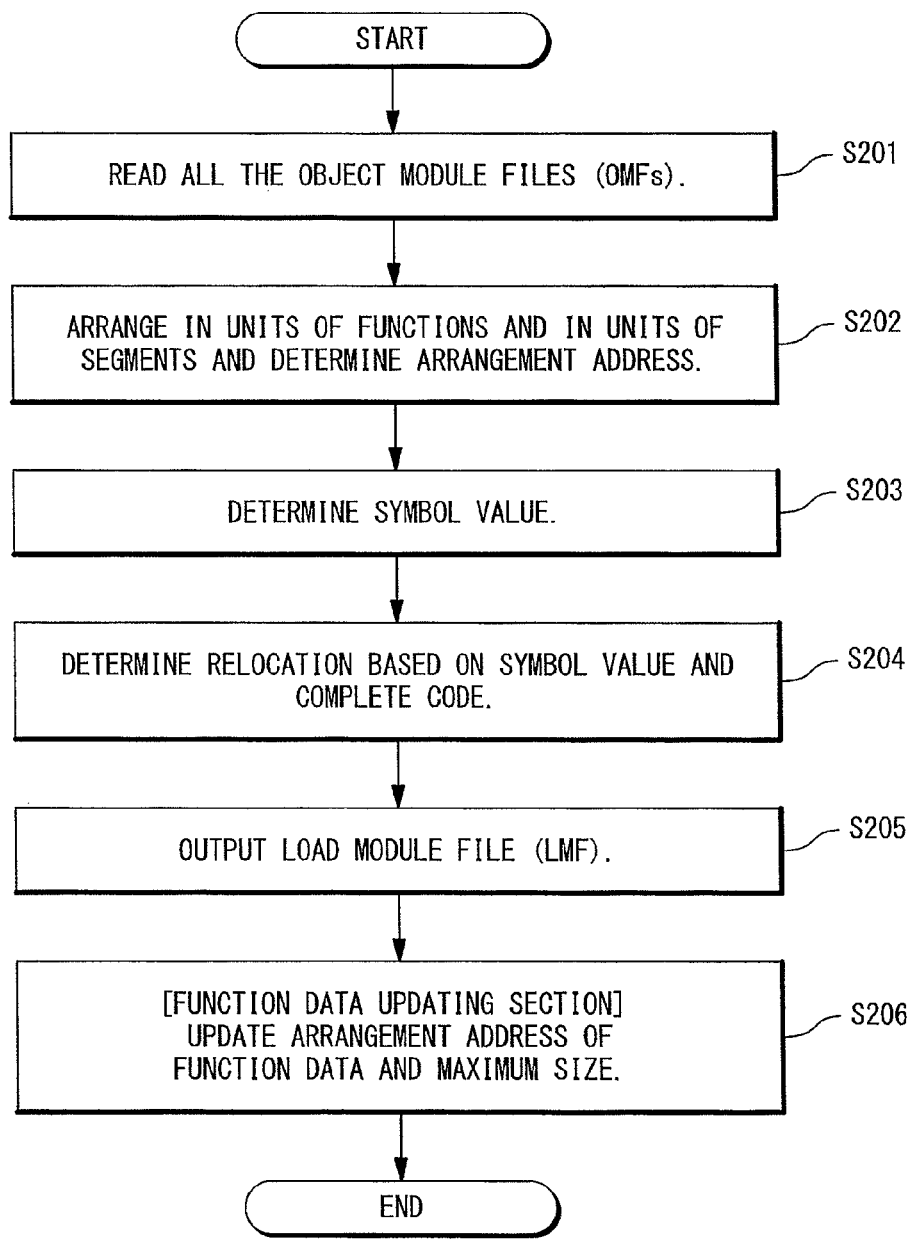
FIG. 11 is a flowchart of a linking process in the present invention.

The process in the linking section 200 will be described below with reference to FIG. 11.

(1) Step S201

The input section 201 inputs the OMF 402 outputted from the compiling section 100. Here, the input section 201 reads all of the OMF 402 that can be read.

(2) Step S202

The arranging section 202 carries out the arrangement for every function and for every segment, in accordance with the OMF 402, and determines arrangement addresses. At this time, the arranging section 202 simultaneously performs an updating process on the arrangement data 207 for the determined arrangement addresses.

(3) Step S203

The symbol solving section 203 updates symbol values in accordance with the OMF 402. At this time, the symbol solving section 203 simultaneously performs the updating process on the symbol data 208 in accordance with the updated symbol values.

(4) Step S204

The code generating section 204 solves the re-location (re-arrangement) in accordance with the symbol values, and completes the object code. Here, the code generating section 204 uses the determined symbol values to re-arrange the functions and generates the object code in an execution format.

(5) Step S205

The code generating section 204 outputs the object code in the execution format to the LMF 404 for post-modification. Here, the code generating section 204 adds the object code in the execution format for every function and for every segment, to the LMF 404 for post-modification. The code generating section 204 determines the LMF 404 after the modification, when for all of the functions, the object code in the execution format is outputted to the LMF 404 for post-modification. After that, the output section 206 outputs the LMF 404 for post-modification.

(6) Step S206

When the code generating section 204 outputs the object code in the execution format to the LMF 404 for post-modification, the function data updating section 205 refers to the updated arrangement data 207 and the symbol data 208 and updates even the data in the function data 403. Here, the function data updating section 205 updates the arrangement address and the maximum size of the function data 403.

FIGS. 12A, 12B and 12C show the function data, the symbol data and the debug data at this time (immediately after the linking process).

It should be noted that, in the present invention, a series of processes is referred to as a second object code generating process, processes from a process in which the input section 101 of the compiling section 100 inputs the new C source file 20 after the modification, to a process in which the function data updating section 205 of the linking section 200 updates the maximum size and the output section 206 outputs the LMF 404. Also, a combination of the compiling section 100 and the linking section 200 is referred to as a second object code generating section, which performs the processes on the new C source file 20.

(Debugging Process)

Figure 13:
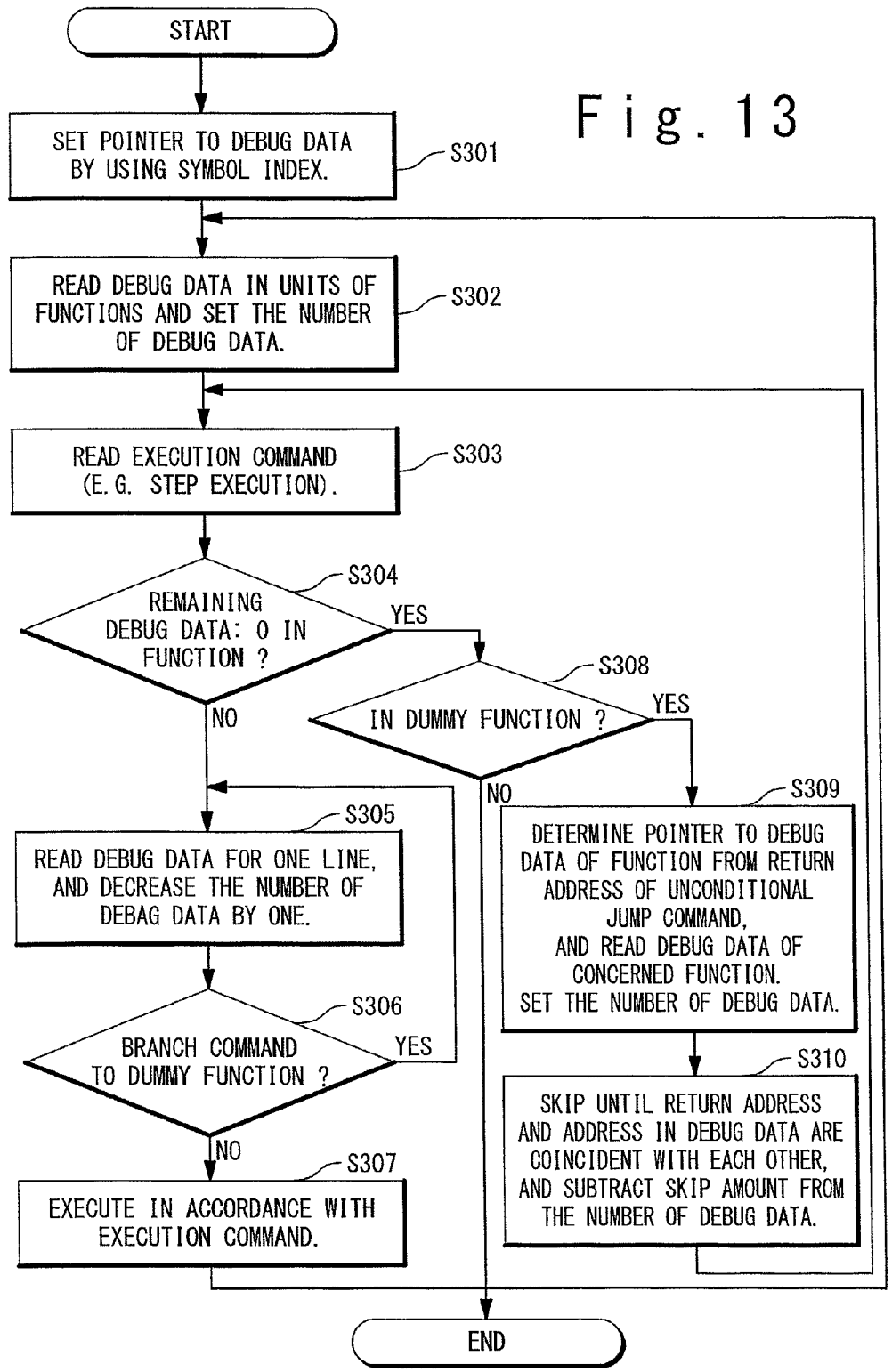
FIG. 13 is a flowchart in a debugging operation in the present invention.

A process in the debugging section 300 will be described below with reference to FIG. 13. Here, the debugging process that uses the LMF 404 outputted from the linking section 200 will be described.

(1) Step S301

The input section 301 reads the LMF 404 to acquire the object code, the debug data 304 and the symbol data 305 from the LMF 404, stores the object code, the debug data 304 and the symbol data 305 in a temporary region, and uses a symbol index of the symbol data 305 to set a pointer to the debug data 304 of the function. The temporary region is a storage region for temporarily storing a data such as a buffer, and a cache.

(2) Step S302

The input section 301 sets the number of pieces of the debug data for every function and reads the debug data 304. Here, the input section 301 reads the debug data 304 for every function. Also, the input section 301 sets the number of pieces of the debug data for every function.

(3) Step S303

The input section 301 reads an execution command instructed from the input/output unit 405 by the user. As an example of the execution command, the step execution of the code in the debug and the like are considered.

(4) Step S304

The command executing section 302 checks whether or not the number of pieces of the debug data in the function is 0. Here, the command executing section 302 continues the processes until the debug data in the function does not exist.

(5) Step S305

If the debug data exists in the function, the command executing section 302 reads the debug data for one line and decrements the number of pieces of the debug data by one. That is, the command executing section 302 reads the debug data for each line, and decreases the number of pieces of the debug data remaining in the function, for the number of lines of the read debug data.

(6) Step S306

The command executing section 302 determines whether or not the read debug data for one line is a branch command to the dummy function. Here, the command executing section 302 determines whether or not it is the branch command to the dummy function, in accordance with the presence or absence of a command branch flag in the read debug data for one line. At this time, if it is the branch command to the dummy function, the command executing section 302 finishes the process for the read debug data for one line and reads the debug data in a next line.

(7) Step S307

If it is not the branch command to the dummy function, the command executing section 302 executes the read command. At this time, the display section 303 outputs an execution result of the command to the input/output unit 405. After that, the command executing section 302 again sets the number of pieces of the debug data for every function and reads the debug data 304.

(8) Step S308

Next, when the debug data in the function does not exist, the command executing section 302 checks whether or not the debug based on the read debug data is the debug in the dummy function. At this time, when it is the debug outside the dummy function (it is not the debug in the dummy function), the command executing section 302 ends the debug of the function.

(9) Step S309

When it is the debug in the dummy function, the command executing section 302 determines a pointer to the debug data of the function from a return address of an unconditional jump command, and reads the debug data 304 of the corresponding function. Moreover, the command executing section 302 sets the number of pieces of the debug data.

(10) Step S310

The command executing section 302 carries out a skip until the return address and the in-debug-data address coincide with each other, and after decreasing the skipped addresses from the number of pieces of the debug data, the command executing section 302 continues the process of the execution command instructed by the user.

In the present invention, when the C source file is compiled and linked, the function data is generated that holds the data such as the function name, the arrangement address, the maximum size and the dummy function flag, as shown in FIG. 4. Then, when a certain specific function is modified and it is again compiled and linked, it is determined whether or not the code size in units of functions is larger than the code size for the old C source file before the modification. When the code size for the new C source file after the modification is determined to be larger, an exceeding portion from the code size for the old C source file is outputted as a dummy function. Consequently, the number of branch commands to be outputted is suppressed to a minimum, by paying attention to the difference in the code size, not to the modification to the C source file.

Second Embodiment

The second embodiment of the present invention will be described below. In the first embodiment, the code size for the old C source file is not changed in the arrangement addresses and the code for the additional size is arranged as the dummy function. However, a case may possibly exist that there is a necessity of automatically inserting a branch command in the course of the function or avoiding interruption, in the embedded file development. Thus, the countermeasure against it will be described in the second embodiment.

The system configuration and control flow of the source code generating system in the second embodiment are similar to those of the first embodiment. When the code size for the new C source file 20 after the modification is larger than that for the old C source file 10 before the modification, the dummy function is unconditionally generated. Thereby, a case can be avoided that the branch command is automatically inserted in the course of the code of the function, and the interruption is set.

Figure 14:
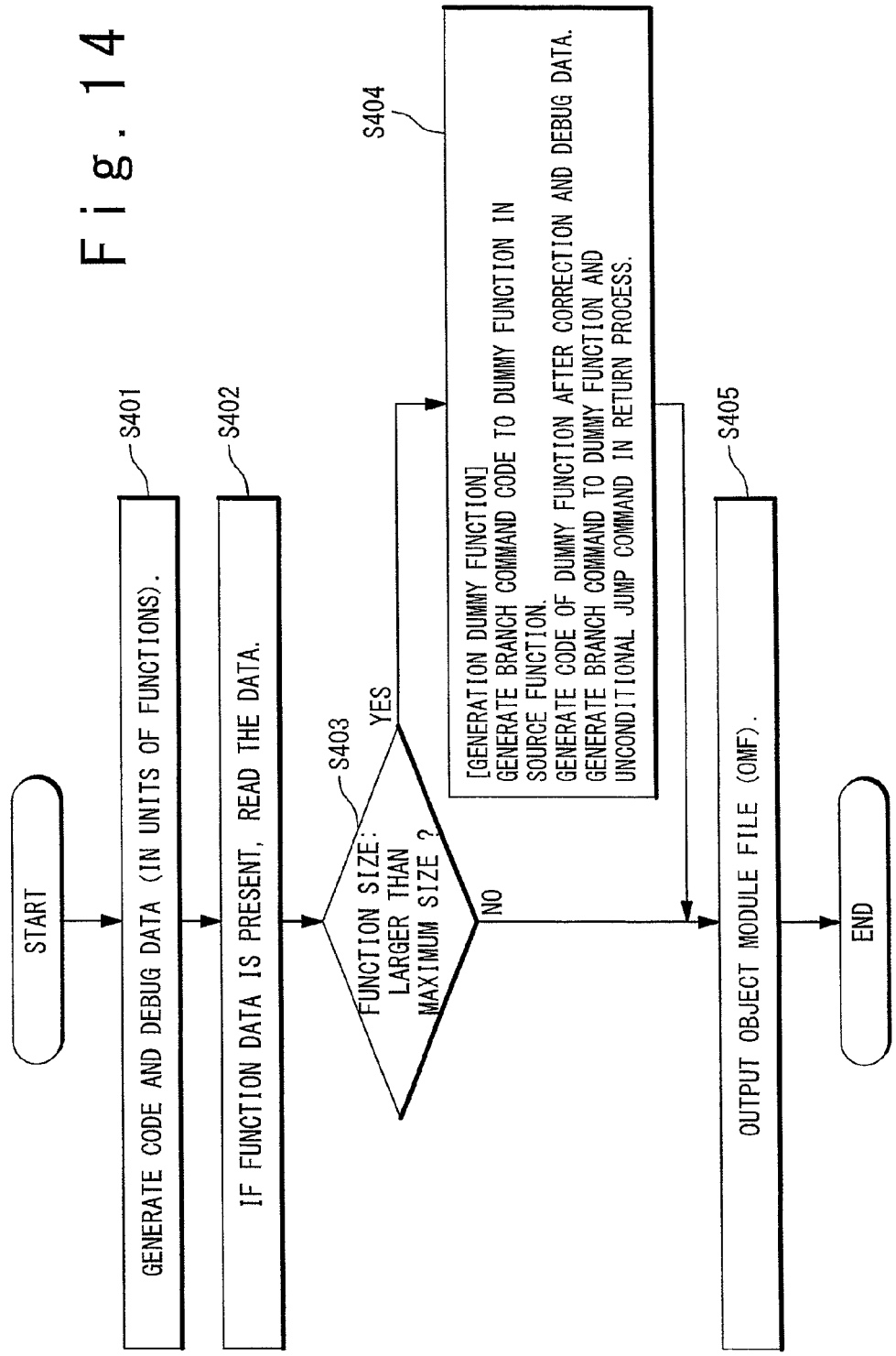
FIG. 14 is a flowchart in a compiling operation by the object code generating system according to a second embodiment of the present invention.

FIG. 14 is a flowchart showing the compiling process in the second embodiment of the present invention. In FIG. 14, the process corresponding to the step S104 in the flowchart of the compiling process in the first embodiment shown in FIG. 9 is changed.

(1) Step S401

The compiling section 100 reads the new C source file 20 after the modification, and the processes of the symbol registering section 102, the code data generating section 103 and the debug data generating section 104 generates the object code and the debug data 108 for every function, and also generates the symbol data 107 and the debug data 108, in the course of the generation. Here, the input section 101 inputs the new C source file 20. The symbol registering section 102 generates the symbol data 107 of the function after the modification in accordance with the new C source file 20. The code data generating section 103 generates the object code of the function after the modification in accordance with the new C source file 20. The debug data generating section 104 generates the debug data 108 of the function after the modification in accordance with the new C source file 20. These processes are same as those of the step S101 shown in FIG. 9.

(2) Step S402

The code & debug data updating section 105 reads the function data 403 generated when the old C source file 10 before the modification is compiled. Here, the code & debug data updating section 105 reads the function data 403 through the input section 101. This process is equal to that of the step S102 shown in FIG. 9.

(3) Step S403

The code & debug data updating section 105 checks whether or not the object code size of the function after the modification is larger than the maximum size of the function in the old C source file 10 in the function data 403. Here, the code & debug data updating section 105 compares the object code size of the function after the modification generated at the step S101 and the maximum size of the function in the old C source file 10 in the function data 403. This process is same as that of the step S103 shown in FIG. 9

(4) Step S404

When the object code size of the function after the modification is larger than the maximum size of the function in the old C source file 10 in the function data 403, the code & debug data updating section 105 unconditionally divides the original function (the function after the modification), and generates a dummy function and a code of a branch command to the dummy function in the original function. Also, the code & debug data updating section 105 generates the code and the debug data 108 for the dummy function. Moreover, the code & debug data updating section 105 generates the branch command to the dummy function and the unconditional jump command at the time of a returning process. Here, the code & debug data updating section 105 adds the code of the branch command to the dummy function to the code of the original function. Also, the code & debug data updating section 105 adds a data of a line (address) to which the branch command to the dummy function is added, to the debug data 108. This process differs from that of the step S104 shown in FIG. 9.

(5) Step S405

The code & debug data updating section 105 outputs the object code of the function after the modification, to the OMF 402 for post-modification. Here, the code & debug data updating section 105 adds the object code of the function after the modification, to the OMF 402 for post-modification for each function. In the OMF 402 for post-modification, the branch command to the dummy function and the unconditional jump command at the time of the returning process are added to the OMF 402 for pre-modification. The code & debug data updating section 105 determines the OMF 402 for post-modification, when the object code of the function after the modification is outputted to the OMF 402 for post-modification, for all of the functions. After that, the output section 106 outputs the OMF 402 for post-modification. This process is same as that of the step S105 shown in FIG. 9.

Figure 15:
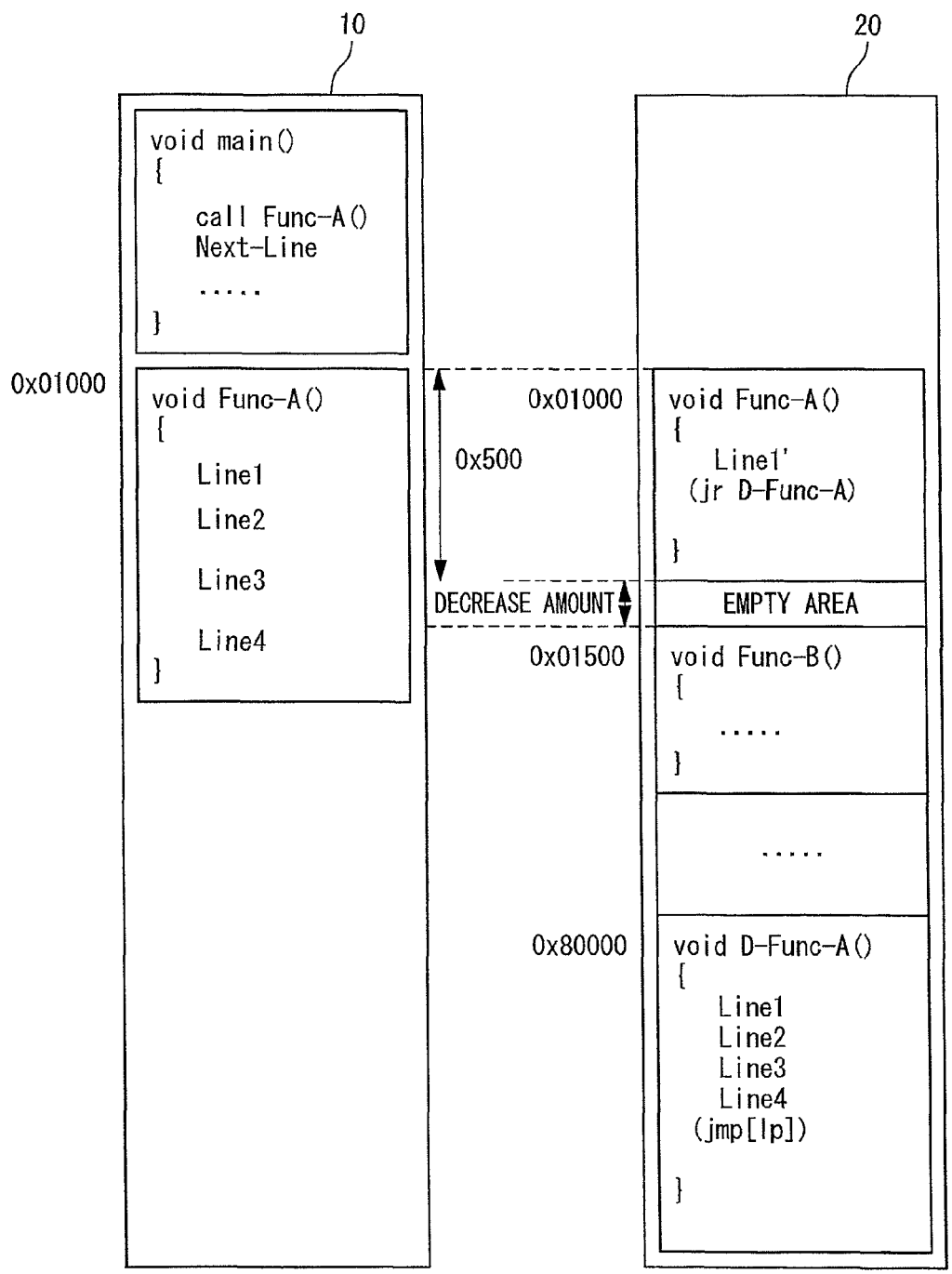
FIG. 15 is a diagram showing an example after the modification of the source program file and the generation of a dummy function in the second embodiment of the present invention.

FIG. 15 shows an example after the modification of the source file and after the generation of the dummy function, in the second embodiment of the present invention.

FIGS. 16A, 16B and 16C show examples of the function data, the debug data and the symbol data, after a function for post-modification in the second embodiment of the present invention is linked.

Third Embodiment

The third embodiment of the present invention will be described below.

The control flow in the third embodiment of the present invention is same as those of the first and second embodiments. It should be noted that in this embodiment, whether or not the dummy function should be generated is determined by specifying a command line within a function after the modification, by using an option such as "#pragura".

(Compiling Process in Third Embodiment)

FIG. 17 is a flowchart showing the compiling process in the third embodiment of the present invention. In FIG. 17, the process corresponding to the step S103 in the flowchart of the compiling process in the first embodiment shown in FIG. 9 is changed.

(1) Step S501

The compiling section 100 reads the new C source file 20 after the modification, and the processes of the symbol registering section 102, the code data generating section 103 and the debug data generating section 104 generate the object code and the debug data 108 in units of functions, and also generate the symbol data 107 and the debug data 108 in the course of the generation. Here, the input section 101 inputs the new C source file 20. The symbol registering section 102 generates the symbol data 107 of the function after the modification in accordance with the new C source file 20. The code data generating section 103 generates the object code of the function after the modification in accordance with the new C source file 20. The debug data generating section 104 generates the debug data 108 of the function after the modification in accordance with the new C source file 20. These processes are same as those of the step S101 shown in FIG. 9.

(2) Step S502

The code & debug data updating section 105 reads the function data 403 generated when the old C source file 10 is compiled. Here, the code & debug data updating section 105 reads the function data 403 generated when the old C source file 10 is compiled. This process is same as that of the step S102 shown in FIG. 9.

(3) Step S503

The code & debug data updating section 105 checks whether or not the function after the modification is a "#pragura" specification function (the function in which "#pragura" has been specified). Here, the code & debug data updating section 105 determines whether or not the user specifies the function after the modification by using the option such as "#pragura", and specifies a command line or a line in the C source file. The code & debug data updating section 105 determines whether or not the dummy function should be generated, by using the option such as "#pragura". This process differs from that of the step S103 shown in FIG. 9. At this time, if the function after the modification is not the "#pragura" specification function, the code & debug data updating section 105 uses the object code of the function after the modification in its original state.

(4) Step S504

If the function after the modification is the "#pragura" specification function, the code & debug data updating section 105 divides the original function (the function after the modification), and generates the dummy function. Here, the code & debug data updating section 105 generates the code of the branch command to the dummy function and the unconditional jump command at the time of the returning process. These processes are same as those of the step S104 shown in FIG. 9 or the step S404 shown in FIG. 14.

(5) Step S505

The code & debug data updating section 105 outputs the object code of the function after the modification to the OMF 402 for the new C source file 20. Here, the code & debug data updating section 105 adds the object code of the function after the modification, to the OMF 402 for post-modification for each function. In the OMF 402 for post-modification, the branch command to the dummy function and the unconditional jump command at the time of the returning process are added to the OMF 402 for pre-modification. The code & debug data updating section 105 determines the OMF 402 for post-modification, when the object code of the function after the modification is outputted to the OMF 402 for post-modification for all of the functions. After that, the output section 106 outputs the OMF 402 for post-modification. This process is same as that of the step S105 shown in FIG. 9.

It should be noted that as for the above mentioned respective embodiments, any combination of them can be executed.

As mentioned above, the object code generating system of the present invention automatically generates/updates the function data generated when the old C source file before the modification is compiled and linked.

Also, the object code generating system of the present invention compares the code size of the function in the old C source file 10 and the code size of the function after the modification. The dummy function is generated only for the modified function after the modification, if the code size in the new C source file 20 is larger. Thus, the arrangement addresses of other non-modified functions are not required to be changed, thereby the suppression to the minimum branch command.

Also, the object code generating system of the present invention specifies the dummy function on the basis of the debug data of the function before the modification. Thus, the user can debug the new C source file, without recognizing the jump to the dummy function from the function before the modification when it is debugged.

Moreover, the object code generating system of the present invention does not change the arrangement addresses of other non-modified functions. Thus, the debug of the non-modified functions can be omitted.

The object code generating system of the present invention contains a compiler for generating the function data.

This compiler again reads the function data, compares the size for the file after the modification and the original size, and if the size for the file after the modification is larger than the original size, the dummy function is generated.

This compiler generates the debug data without any separation from the original function, even if the dummy function is generated.

Also, the object code generating system of the present invention contains the linker for updating the link result into the function data.

This linker arranges the functions at the same addresses as those for the file before the modification in accordance with the function data.

Also, the object code generating system of the present invention contains the debugger that can carry out the debug without making the user recognize, at the time of the returning from the dummy function, when it is switched to the dummy function, in accordance with the debug data outputted without any separation between the dummy function and the original function.

In the present invention, the function data generated when the old C source file before the modification is compiled and linked is automatically generated and updated. Thus, unlike the conventional technique, the user is not required to separately prepare a block data of a flash memory. In the function data, in accordance with the difference from the code size data of the function data held when the C source file after the modification is compiled, an increase portion of the code of the function in the old C source file 10 from the code the function after the modification is generated as the dummy function, and the branch command (jump command) to the dummy function from the function in the old C source file 10 is generated. In the conventional technique, when there are a plurality of modification portions in the function, the jump commands for the number of the modification portions are inserted into the object code in the function. However, in the present invention, it is enough to generate the jump command for one portion.

Also, in the present invention, the dummy function is arranged in the open region. However, since the dummy function is specified on the basis of the debug data of the function in the old C source file, the user can debug the new C source without recognizing the jump to the dummy function from the function before the change when it is debugged. Moreover, the arrangement addresses of other non-modified functions are not changed. Thus, the debug of the non-modified functions can be omitted.

As mentioned above, the embodiments of the present invention have been described in detail. Actually, it is not limited to the above-mentioned embodiments. Even the change in the range without departing from the spirit and scope of the present invention is included in the present invention.

What is claimed is:

1. An object code generating system comprising:
a storage unit configured to store a first source file; and
an object code generating section, comprising a processor, configured to:
read said first source file from said storage unit,
generate function data to store in said storage unit, said function data indicating an arrangement address and size of each of functions in said first source file, and
generate an execution format file for said first source file to store in said storage unit; and
read a second source file obtained by modifying at least one of said functions as a specific function in said first source file, and said function data from said storage unit,
generate a dummy function corresponding to said modified specific function when said modified specific function having a size larger than a maximum size of the sizes of said functions in said function data is discovered in said second source file,
arrange said dummy function at an arrangement address different from the arrangement addresses of said functions,
arrange a branch command to said dummy function at the different arrangement address,
wherein said object code generating section checks whether or not a predetermined option has been specified for said modified specific function, and
divide said modified specific function to generate said dummy function, when said predetermined option is specified for said modified specific function.

2. The object code generating system according to claim 1, wherein said object code generating section generates said dummy function by dividing said modified specific function such that a summation of code size of said modified specific function and a code size of said branch command to said dummy function is within the maximum size of the sizes of said functions in said function data.

3. The object code generating system according to claim 1, wherein said object code generating section updates said function data for every function with respect to the arrangement address and the maximum size.

4. The object code generating system according to claim 1, further comprising:
a debugging section configured to debug said execution format file,
wherein said debugging section comprises:
an input section configured to read said execution format file from said storage unit to acquire said object code, debug data and symbol data from said execution format file, temporarily store said object code, said debug data and said symbol data a temporal storage region, set a pointer to said debug data of one of said functions by using a symbol index of said symbol data, set the number of pieces of said debug data for every function, and read said debug data and a command;

a command executing section configured to check whether or not the number of remaining pieces of said debug data in said function is 0, read said debug data for one line when there is any pieces of said debug data in the function, decrements the number of pieces of said debug data by one line, determines whether or not the read debug data for one line includes a branch command to said dummy function based on presence or absence of a command branch flag, execute a command of the read debug data when the read debug data for one line does not include the branch command to the dummy function, check whether or not debugging is performed on said dummy function based on the debug data read for every function, when the number of remaining pieces of said debug data in the function is 0, determine an index to said debug data for said function from a return address of a unconditional jump command when the debugging is performed on said dummy function, read the debug data of a corresponding function, set the number of pieces of said debug data, skip until the return address and the address in said debug data are coincident with each other, and continue a process of the read command after decreases the number of skipped addresses from the number of pieces of said debug data; and a display section configured to output an execution result of the read command.

5. An object code generating method executed by a computer, comprising:

reading a first source file from a storage unit;

generating function data to store in said storage unit, wherein said function data indicates an arrangement address and size of each of functions in said first source file;

generating an execution format file for said first source file to store in said storage unit;

reading a second source file obtained by modifying at least one of said functions as a specific function in said first source file, and said function data from said storage unit;

generating a dummy function corresponding to said modified specific function when said modified specific function having a size larger than a maximum size of the sizes of said functions in said function data is discovered in said second source file;

arranging said dummy function at an arrangement address different from the arrangement addresses of said functions;

arranging a branch command to said dummy function at the different arrangement address, checking whether or not a predetermined option has been specified for said modified specific function; and dividing said modified specific function to generate said dummy function, when said predetermined option is specified for said modified specific function.

6. The object code generating method according to claim 5, wherein said generating a dummy function comprises:

generating said dummy function by dividing said modified specific function such that a summation of code size of said modified specific function and a code size of said branch command to said dummy function is within the maximum size of the sizes of said functions in said function data.

7. The object code generating method according to claim 5, further comprising:

updating said function data for every function with respect to the arrangement address and the maximum size.

8. The object code generating method according to claim 5, further comprising:

debugging said execution format file, wherein said debugging comprises:

reading said execution format file from said storage unit to acquire said object code, debug data and symbol data from said execution format file;

setting a pointer to said debug data of one of said functions by using a symbol index of said symbol data;

setting the number of pieces of said debug data for every function;

reading said debug data and a command;

checking whether or not the number of remaining pieces of said debug data in said function is 0;

reading said debug data for one line when there is any pieces of said debug data in the function;

decrementing the number of pieces of said debug data by one line;

determining whether or not the read debug data for one line includes a branch command to said dummy function, based on presence or absence of a command branch flag;

executing a command of the read debug data when the read debug data for one line does not include the branch command to the dummy function;

checking whether or not debugging is performed on said dummy function based on the debug data read for every function, when the number of remaining pieces of said debug data in the function is 0;

determining an index to said debug data for the function from a return address of a unconditional jump command when the debugging is performed on said dummy function;

reading the debug data of the function based on the index;

setting the number of pieces of said debug data;

skipping until the return address and the address in said debug data are coincident with each other;

continuing a process of the read command after decreases the number of skipped addresses from the number of pieces of said debug data; and outputting an execution result of the read command.

9. A non-transitory computer-readable recording medium in which a computer-executable program code is stored to attain an object code generating method which comprises:

reading a first source file from a storage unit;

generating function data to store in said storage unit, wherein said function data indicates an arrangement address and size of each of functions in said first source file;

generating an execution format file for said first source file to store in said storage unit;

reading a second source file obtained by modifying at least one of said functions as a specific function in said first source file, and said function data from said storage unit;

generating a dummy function corresponding to said modified specific function when said modified specific function having a size larger than a maximum size of the sizes of said functions in said function data is discovered in said second source file, arranging said dummy function at an arrangement address different from the arrangement addresses of said functions, arranging a branch command to said dummy function at the different arrangement address, checking whether or not a predetermined option has been specified for said modified specific function; and dividing said modified specific function to generate said dummy function, when said predetermined option is specified for said modified specific function.

10. The non-transitory computer-readable recording medium according to claim 9, wherein said generating a dummy function comprises:

generating said dummy function by dividing said modified specific function such that a summation of code size of said modified specific function and a code size of said branch command to said dummy function is within the maximum size of the sizes of said functions in said function data.

11. The non-transitory computer-readable recording medium according to claim 9 further comprising:

updating said function data for every function with respect to the arrangement address and the maximum size.

12. The non-transitory computer-readable recording medium according to claim 9, further comprising:

debugging said execution format file,
wherein said debugging comprises:
reading said execution format file from said storage unit to acquire said object code, debug data and symbol data from said execution format file;
setting a pointer to said debug data of one of said functions by using a symbol index of said symbol data;
setting the number of pieces of said debug data for every function;
reading said debug data and a command;
checking whether or not the number of remaining pieces of said debug data in said function is 0;
reading said debug data for one line when there is any pieces of said debug data in the function;
decrementing the number of pieces of said debug data by one line;
determining whether or not the read debug data for one line includes a branch command to said dummy function, based on presence or absence of a command branch flag;
executing a command of the read debug data when the read debug data for one line does not include the branch command to the dummy function;
checking whether or not debugging is performed on said dummy function based on the debug data read for every function, when the number of remaining pieces of said debug data in the function is 0;
determining an index to said debug data for the function from a return address of a unconditional jump command when the debugging is performed on said dummy function;
reading the debug data of the function based on the index;
setting the number of pieces of said debug data;
skipping until the return address and the address in said debug data are coincident with each other;
continuing a process of the read command after decreases the number of skipped addresses from the number of pieces of said debug data; and
outputting an execution result of the read command.

* * * * *